(12) United States Patent
Suzuki et al.

(10) Patent No.: US 8,938,378 B2
(45) Date of Patent: Jan. 20, 2015

(54) FORMING SIMULATION METHOD, FORMING SIMULATION APPARATUS, FORMING SIMULATION PROGRAM, AND RECORDING MEDIUM

(75) Inventors: Noriyuki Suzuki, Tokyo (JP); Shigeru Yonemura, Tokyo (JP); Akihiro Uenishi, Tokyo (JP); Takuya Kuwayama, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 419 days.

(21) Appl. No.: 13/264,319

(22) PCT Filed: Apr. 19, 2010

(86) PCT No.: PCT/JP2010/002819
§ 371 (c)(1),
(2), (4) Date: Oct. 13, 2011

(87) PCT Pub. No.: WO2010/122769
PCT Pub. Date: Oct. 28, 2010

(65) Prior Publication Data
US 2012/0035890 A1 Feb. 9, 2012

(30) Foreign Application Priority Data

Apr. 20, 2009 (JP) ................ P2009-102123

(51) Int. Cl.
*G06G 7/48* (2006.01)
*G06F 17/10* (2006.01)
*B21D 22/20* (2006.01)
*G06F 17/50* (2006.01)

(52) U.S. Cl.
CPC ............ *B21D 22/20* (2013.01); *G06F 2217/42* (2013.01); *Y02T 10/82* (2013.01); *G06F 2217/41* (2013.01); *G06F 17/5018* (2013.01)
USPC ..................................... 703/7; 703/2

(58) Field of Classification Search
CPC ............ G06F 17/5009; G06F 17/5018; G06F 2217/16
See application file for complete search history.

(56) References Cited

U.S. PATENT DOCUMENTS

2009/0055143 A1  2/2009  Ichikawa et al.

FOREIGN PATENT DOCUMENTS

| CN | 1928879 A | 3/2007 |
|----|-----------|--------|
| CN | 101050960 A | 10/2007 |
| JP | 2002-219523 A | 8/2002 |
| JP | 2005-111510 A | 4/2005 |

(Continued)

OTHER PUBLICATIONS

Lee et al., Experimental and Analytical Evaluation for Elastic Deformation Behaviors of Cold Forging Tool, Journal of Materials Processing Technology 127 (2002) 73-82.*

(Continued)

*Primary Examiner* — Kandasamy Thangavelu
*Assistant Examiner* — Michael P Healey
(74) *Attorney, Agent, or Firm* — Birch, Stewart, Kolasch & Birch, LLP

(57) ABSTRACT

The present invention provides a press forming simulation method using a finite element method for a sheet metal, in which a deformation state of a pressing tool is represented with high accuracy by superimposing at least one natural mode, for the surface shape of the pressing tool, in a no-load state.

14 Claims, 10 Drawing Sheets

(56) References Cited

FOREIGN PATENT DOCUMENTS

| JP | 2005-138119 A | 6/2005 |
|---|---|---|
| JP | 2005-138120 A | 6/2005 |
| KR | 10-2009-0017985 A | 2/2009 |

OTHER PUBLICATIONS

Lingbeek, Virtual Tool Reworking: New Strategies in Die Design Using Finite Element Forming Simulations, Mar. 2008.*

Bitzenbauer et al., Deformable Rigid Bodies in LS-DYNA with Applications—Merits and Limits, Proceedings 5th European LS-DYNA User Conference, Birmingham, May 2005.*

Cano et al., Dynamic Metrology Tool to measure the Elastic Deformation of Parallel Kinematics Machines, Mar. 9, 2009.*

Lingbeek et al., Towards Efficient Modelling of Macro and Micro Tool Deformations in Sheet Metal Forming, NUMIFORM '07, Materials Processing and Design: Modeling, Simulation and Applications, 2007.*

Struck et al., Considering Tool and Press Elasticity within the Forming Simulation and Experimental Validation, 7. LS-DYNA Anwenderforum, Bamberg 2008.*

International Search Report, PCT/JP2010/002819, Jul. 13, 2010.

Takamura et al., "Sheet Forming Simulation Using Static FEM Program and Coupled with Elastic Deformation of Tools", Japan Society of Mechanical Engineers ISSN: 1348026X, vol. 2003, No. 16, Nov. 22, 2003, pp. 589-590.

Washizu et al., "Finite element method handbook", Baihukan, 1981.

Chinese Office Action dated Nov. 28, 2012 for Chinese Application No. 201080016963.0 with English translation.

Korean Office Action, dated May 9, 2013, for Korean Application No. 10-2011-7024392.

Japanese Office Action dated Nov. 15, 2011, issued in corresponding Japanese Patent Application No. 2011-510191 (English Translation attached).

Takashi Suzuki; Looking into the latest trends in Mechanism Analysis; Nikkei Digital Engineering, Nikkei Business Publications, Inc.; Nov. 15, 2002; vol. 60; pp. 28-29.

\* cited by examiner

US 8,938,378 B2

FORMING SIMULATION METHOD, FORMING SIMULATION APPARATUS, FORMING SIMULATION PROGRAM, AND RECORDING MEDIUM

TECHNICAL FIELD

The present invention relates to a forming simulation method, a forming simulation apparatus, a forming simulation program, and a recording medium thereof; for forming a sheet metal, such as sheet iron or sheet aluminum.

Priority is claimed on Japanese Patent Application No. 2009-102123, filed on Apr. 20, 2009, the content of which is incorporated herein by reference.

BACKGROUND ART

In the related art, products manufactured by pressing a sheet metal (hereafter, blank), such as sheet iron or sheet aluminum, with a pair of upper and lower concave and convex pressing tools in a predetermined shape, are often used for automotive parts or home appliances. Recently, it is common to see higher-strength materials being used to reduce the thickness of materials in order to reduce the weight of products. On the other hand, since a forming-reacting force increases when pressing a high-strength material, the die or the pressing device elastically deforms, such that the material cannot be machined with predetermined dimensions in some cases.

In more detail, in a forming process, a blank is held by a fixed lower pressing tool (die), a wrinkle-pressing tool (blank holder) is hydraulically operated to apply pressure, and then an upper pressing tool (punch) draws the blank while traveling down to a predetermined depth. With an insufficient wrinkle-pressing pressure (blank hold pressure), the blank wrinkles, whereas with too high a wrinkle-pressing pressure, the blank cracks. Therefore, it is important to obtain a good product to apply an optimal blank hold pressure and, recently, forming simulation using the Finite Element Method is actively used to examine the optimal blank hold conditions.

In a common forming simulation, the contact status between the die and the blank is sequentially determined, on the assumption that the die is a rigid body and the blank is a deformable body. On the basis of this determination, the deforming process of the blank is calculated step by step.

Meanwhile, in practical forming, elastic deformation or poor parallelism of the up-down matching surfaces is caused by various factors, such as the degree of precision in positioning of the punch and die (the up-down matching surface), the pressing point of the blank holder (position of a cushion pin), rigidity of the press and die, and deforming resistance of the blank or the plate thickness. Therefore, it is necessary to consider the elastic deformation of the die or the parallelism of the up-down matching surface.

Non-patent Document 1 discloses a technology for modeling the blank holder into a deformable body and performing coupled analysis on the elastic deformation of the die and forming of the workpiece.

Further, Patent Document 1 and Patent Document 2 disclose a method of performing an elastic deformation simulation of the die with an input that is a nodal reacting force obtained from a forming simulation on the assumption that the die is a rigid body, and performing recalculation by reflecting the distribution of deflection obtained from the simulation to the die shape in the forming simulation.

RELATED ART DOCUMENTS

Patent Documents

[Patent Document 1] Japanese Unexamined Patent Application, First Publication No. 2005-138120
[Patent Document 2] Japanese Unexamined Patent Application, First Publication No. 2005-138119

Non-Patent Documents

[Non-patent Document 1] A Collection of Learned Papers of A Lecture Meeting of Sheet Fanning Simulation Using Static FEM Program Coupled With Elastic Deformation of Tools, Vol. 2003, No. 16 (20031122) pp. 589-590, Japan Society of Mechanical Engineers ISSN:1348026X, Takamura Masato, Ohura Kenichi, Sunaga Hideyuki, Makinouhi Akitake, Cristian TEODOSIU.
[Non-patent Document 2] Finite Element Handbook; Washizu Kyuichiro et. al, Baihukan (1981).

DISCLOSURE OF THE INVENTION

Problems to be Solved by the Invention

However, in regard to the forming simulation that models the pressing tool as an elastic member disclosed in Non-patent Document 1, it is necessary to consider a support device of the pressing tool and the press main body as well as the pressing tool, such that the scale of calculation is very large, and it is not practical.

Further, the scale of calculation is still large even when using a method of sequentially reflecting pressing tool deflection by performing both of the forming simulation and the pressing tool deformation simulation, which are disclosed in Patent Document 1 and Patent Document 2. Therefore, it is very difficult to strictly model a press with a sliding surface and a pressing tool structure in finite elements.

The present invention has been made in view of the above problems, and an object of the invention is to provide a forming simulation method, a forming simulation apparatus, a forming simulation program, and a recording medium thereof, which can extremely efficiently perform forming simulation considering the deformation of the pressing tool and the press in press forming.

Means for Solving the Problems

The present invention uses the following means to solve the problems.

(1) A first aspect of the present invention provides a press forming simulation method using a finite element method for a sheet metal, in which a deformation state of a pressing tool is represented by superimposing at least one natural mode, for the surface shape of the pressing tool, in a no-load state.

(2) In the press forming simulation method described in (1), the natural mode may be selected from the group consisting of a rigid body displacement mode, a rigid body rotation mode, a first order bending deformation mode, and a first order torsional deformation mode.

(3) In the press forming simulation method of (1), a weight coefficient of the natural mode may be sequentially changed in accordance with the forming load.

(4) In the press forming simulation method described in (1), the weight coefficient of the natural mode may be determined in advance from the deformation amount in a pressing test that applies a predetermined forming load.

(5) A second aspect of the present invention provides a press forming method based on the press forming simulation methods of any one of (1) to (4).

(6) A third aspect of the present invention provides a formed product that is pressed on the basis of the press forming simulation methods of any one of (1) to (4).

(7) A fourth aspect of the present invention provides a press forming simulation apparatus using a finite element method for a sheet metal, in which a deformation state of a pressing tool is represented by superimposing at least one natural mode, for the surface shape of the pressing tool, in a no-load state.

(8) In the press forming simulation method described in (7), the natural mode may be selected from the group consisting of a rigid body displacement mode, a rigid body rotation mode, a first order bending deformation mode, and a first order torsional deformation mode.

(9) In the press forming simulation apparatus described in (7) or (8), a weight coefficient of the natural mode may be sequentially changed in accordance with a forming load.

(10) In the press forming simulation described in (7) or (8), the weight coefficient of the natural mode may be determined in advance from the deformation amount in a pressing test that applies a predetermined forming load.

(11) A fifth embodiment of the present invention provides a press forming simulation program using a finite element method for a sheet metal, in which a deformation state of a pressing tool is represented by superimposing at least one natural mode, for the surface shape of the pressing tool, in a no-load state.

(12) In the press forming simulation program described in (11), the natural mode may be selected from the group consisting of a rigid body displacement mode, a rigid body rotation mode, a first order bending deformation mode, and a first order torsional deformation mode.

(13) In the press forming simulation program of (11), a weight coefficient of the natural mode may be sequentially changed in accordance with a forming load.

(14) In the press forming simulation program of (11), the weight coefficient of the natural mode may be determined in advance from the deformation amount in a pressing test that applies a predetermined forming load.

(15) A sixth aspect of the present invention provides a computer-readable recording medium where the program described in any one of (11) to (14) is recorded.

Effects of Invention

According to the present invention, it is possible to efficiently perform forming simulation considering deformation of a pressing tool or a press in pressing.

DESCRIPTION OF EMBODIMENTS

The inventors found that the amount of deformation of a macroscopic deformation mode of a pressing tool that comes in contact with a blank is small, and it is possible to perform approximation to the low-order natural mode even if the product shapes or the pressing tool structures are different, as a result of examining various formed products and forming conditions by mounting a strain gauge and a displacement gauge on the pressing tool in order to ascertain deformation of the pressing tool surface, which comes in contact with the blank, according to a contact reacting force or forming load.

Hereinafter, a forming simulation method according to an embodiment of the present invention, based on these findings, is described with reference to the drawings.

Figure 1:
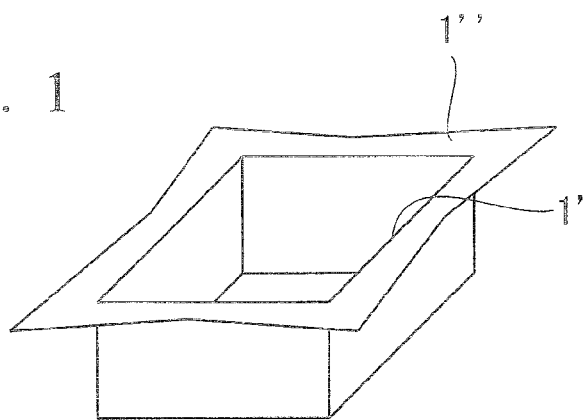
FIG. 1 is a schematic perspective view showing an example of a pressed product that is an object of forming simulation of the present invention.
Figure 2:
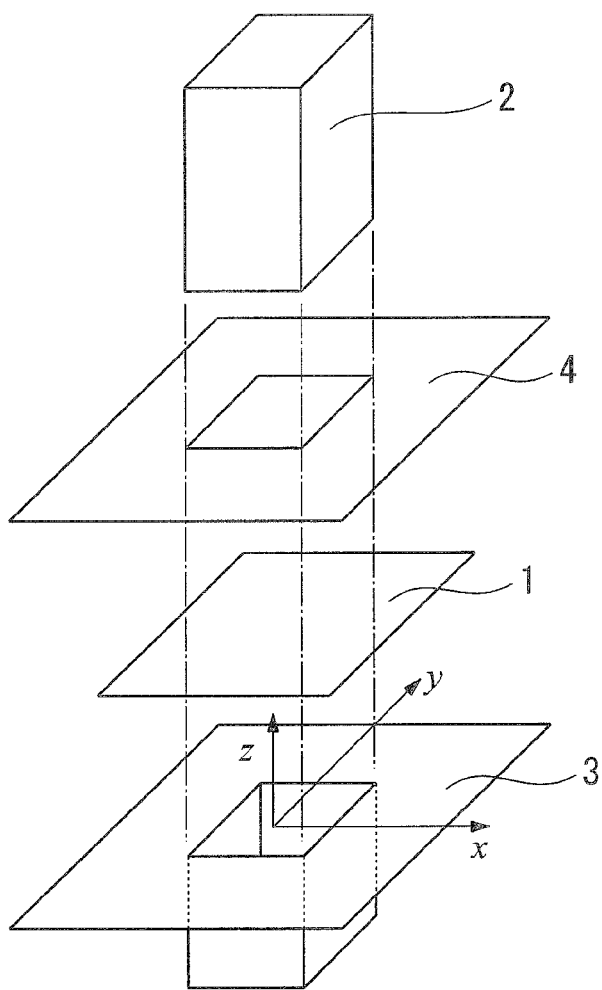
FIG. 2 is a schematic perspective view showing an example of the configuration of a pressing tool and a sheet metal that is a workpiece material for forming the pressed product.

A pressed product 1" that is acquired by press-forming a blank 1 is shown in FIG. 1, as an example of an object for forming simulation. The pressed product 1", for example, as shown in FIG. 2, is acquired by pressing the blank 1 (sheet metal), which is held by a die 3 and a blank holder 4, with a punch 2.

Figure 3:
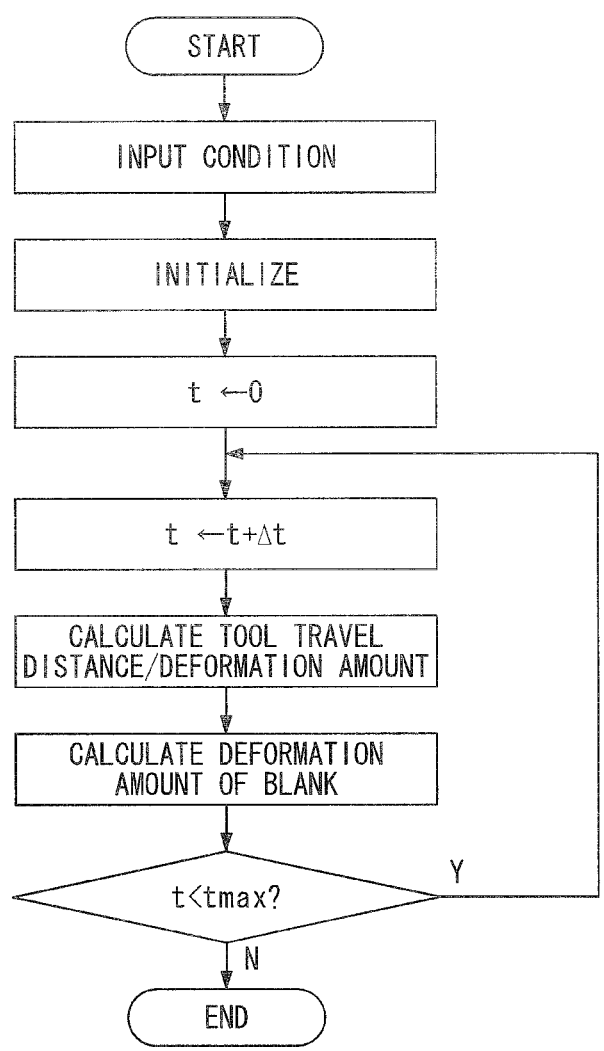
FIG. 3 is a block diagram showing a schematic configuration of a forming simulation apparatus according to the embodiment.

FIG. 3 shows an example of forming simulation according to the embodiment. The forming simulation includes a condition inputting step, an initializing step, a time step, a tool travel distance/deformation amount calculation step, and a blank deformation amount calculation step.

First, in the condition input step, analysis condition data, such as tool shape data, blank shape data, mechanical property data of a blank material, pressing condition data, and time increment are input.

Data representing the surface shape of the initial state without deformation is used as the tool shape data. The data may be data dividing the surfaces of the punch 2, the die 3, and the blank holder 4 in finite element meshes, or data shown on a theoretical curved surface displayed by mathematical expression.

Mesh division data that breaks up a sheet metal, which is cut in advance before forming, generally in a shell (plate and shell) element, may be used as the blank shape data. A thickness, yield stress, a stress-strain relation equation, and anisotropy parameters may be the mechanical property data of the blank.

Data, such as a pressing tool travel distance, a pressing tool travel speed, and a pressing condition, may be given as a function of time or a forming stroke, as the pressing condition data. Further, a pressing tool-blank friction coefficient may be given.

A timestamp when in sequential time increment analysis of the forming process, analysis end conditions, or a result output order may be used as the analysis condition data.

Next, in the initializing step, setting of the initial position and displacement of the pressing tool; displacement, stress, and strain of the blank 1; and time (t) are initialized (0 clear).

Next, in the tool travel distance/deformation amount calculation step, the coordinates on the pressing tool surface after deformation are updated by adding the deformation amount resulting from blank hold pressure onto the coordinates of the pressing tool surface calculated on the basis of the pressing tool travel speed given as a function of time, or a forming stroke while sequentially updating the time steps. That is, for example, the z-coordinate is approximated by using the following equation (Formula 1) when the pressing direction is the z-axis and pressing tool surface coordinates are expressed by x, y, and z in a Cartesian coordinate system.

$$z(x, y) = z_0(x, y) + \sum_{i=0}^{n} a_i w_i(\xi, \eta) \quad \text{(Formula 1)}$$

where, $z_0$ is a coordinate before deformation, $w_i$ is an i-th order natural mode, $a_i$ is a weight coefficient for the natural mode, and n is the maximum order of the natural mode concerned. Further, the natural mode is shown by non-dimensional coordinates ($\zeta, \eta$) that normalize the z-axial projection area dimensions with the pressing tool center as the origin, into $\zeta=2x/L_x$ and $\eta=2y/L_y$ as a rectangular shape of $L_x \times L_y$, instead of the coordinates (x, y).

Here, the forming load may include a blank hold load, a punch load, and a pad load (when using a pad). Further, for the deformation of the pressing tool corresponding to the blank hold load, the gap between the blank holder and the die is considered. For the deformation of the pressing tool corresponding to the punch load, the gap between the punch and the die is considered. For the deformation of the pressing tool corresponding to the pad load, the gap between the pad and the punch is considered. In the actual calculation, any one of a pair of opposite pressing tools may be deformed.

The natural mode is largely categorized into a low-order natural mode and a high-order natural mode. The low-order natural mode includes a rigid body displacement mode shown in FIG. 4A, a rigid body rotation mode shown in FIGS. 4B and 4C, a first order bending deformation mode shown in FIGS. 4D and 4E, and a first order torsional deformation mode shown in FIG. 4F. Further, the high-order natural mode includes a second order bending deformation mode shown in FIGS. 4G and 4H and a second order torsional deformation mode shown in FIGS. 4I and 4J. The inventors found that it is possible to estimate a practically sufficient deformation state of the pressing tool, considering the low-order natural mode, that is, at least the rigid body displacement mode and the first order deformation mode (first order torsional deformation mode or first order bending deformation mode), in a pressing tool of a common press having high rigidity, as a result of performing examination on several products.

The low-order natural mode is, in detail, formulated as follows, for example.

Figure 4A:
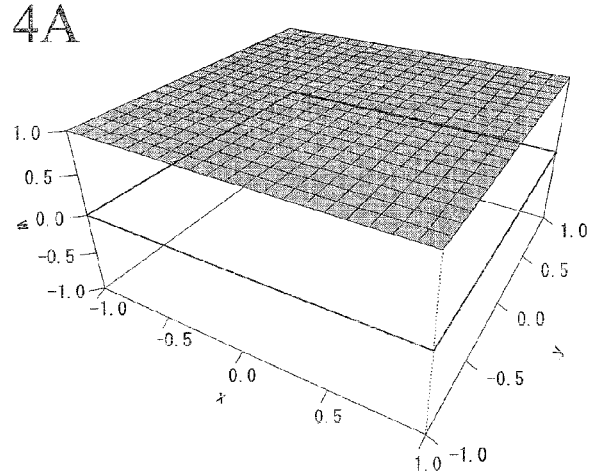
FIG. 4A is a schematic perspective view showing a rigid body displacement mode in the Z-axial direction, as an example of the natural mode of pressing tool deformation.

(Zero-th Order) The z-axial rigid body displacement mode shown in FIG. 4A can be expressed as the following equation (Formula 2).

$$w_0=1 \quad \text{(Formula 2)}$$

Figure 4B:
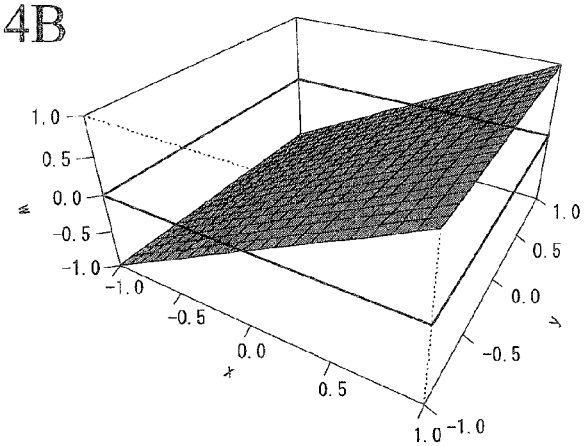
FIG. 4B is a schematic perspective view showing a rigid body rotation mode (about the Y-axis), as an example of the natural mode of pressing tool deformation.

(First Order) The rigid body rotation mode about Y-axis shown in FIG. 4B can be expressed as the following equation (Formula 3).

$$w_1=\zeta \quad \text{(Formula 3)}$$

Figure 4C:
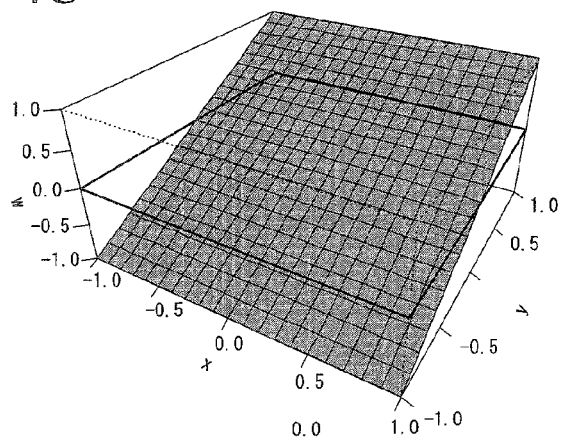
FIG. 4C is a schematic perspective view showing a rigid body rotation mode (about the X-axis), as an example of the natural mode of pressing tool deformation.

(Second Order) The rigid body rotation mode about X-axis shown in FIG. 4C can be expressed as the following equation (Formula 4).

$$w_2=\eta \quad \text{(Formula 4)}$$

Figure 4D:
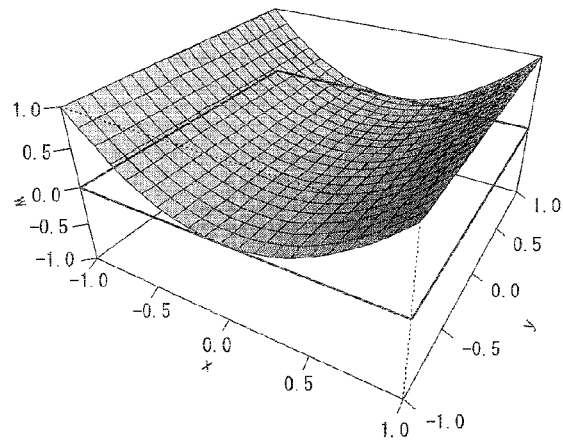
FIG. 4D is a schematic perspective view showing a first order bending deformation mode (the X-axial direction), as an example of the natural mode of pressing tool deformation.

(Third Order) The X-axial first order bending deformation mode shown in FIG. 4D can be expressed as the following equation (Formula 5).

$$w_3=\zeta^2 \quad \text{(Formula 5)}$$

Figure 4E:
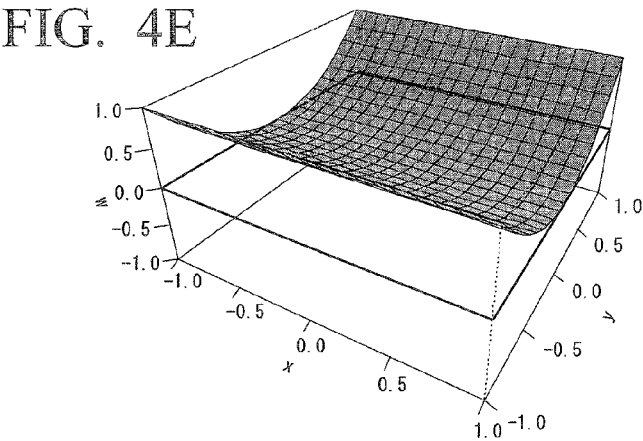
FIG. 4E is a schematic perspective view showing a first order bending deformation mode (the Y-axial direction), as an example of the natural mode of pressing tool deformation.

(Fourth Order) The Y-axial first order bending deformation mode shown in FIG. 4E can be expressed as the following equation (Formula 6).

$$w_4=\eta^2 \quad \text{(Formula 6)}$$

Figure 4F:
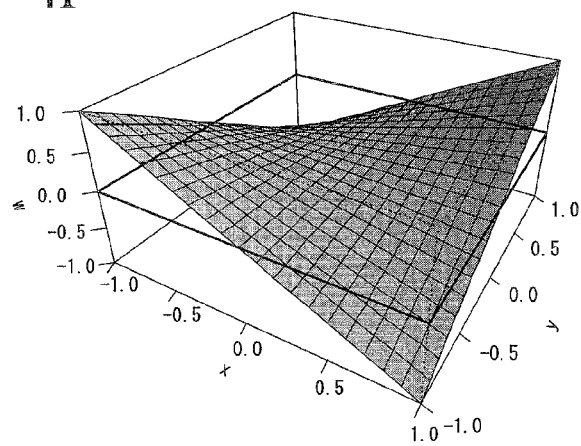
FIG. 4F is a schematic perspective view showing a first order torsional deformation mode, as an example of the natural mode of pressing tool deformation.
Figure 4G:
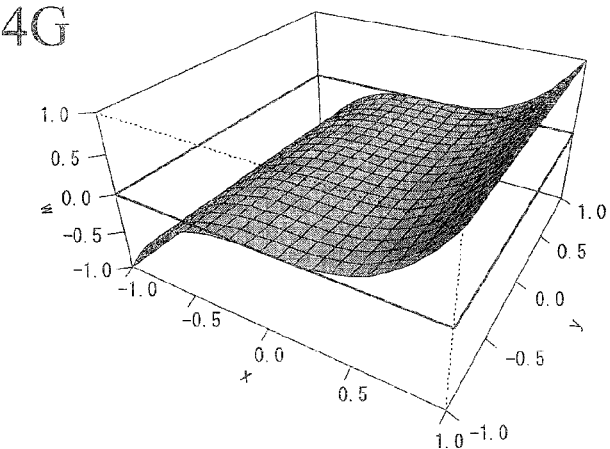
FIG. 4G is a schematic perspective view showing a second order bending deformation mode, as an example of the natural mode of pressing tool deformation.
Figure 4H:
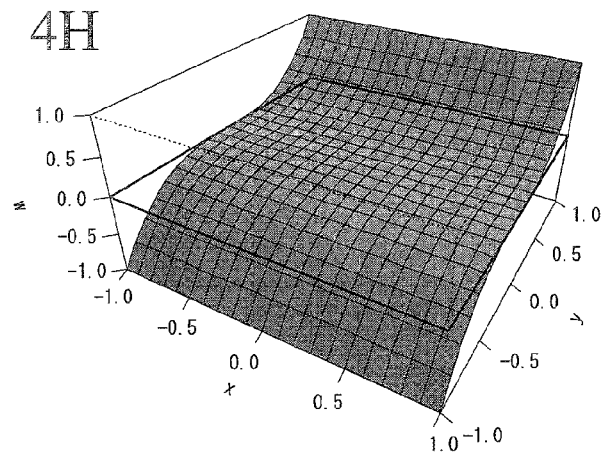
FIG. 4H is a schematic perspective view showing a second order bending deformation mode, as an example of the natural mode of pressing tool deformation.
Figure 4I:
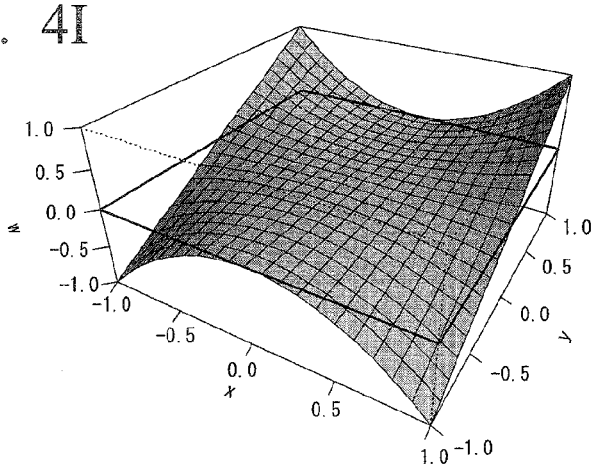
FIG. 4I is a schematic perspective view showing a second order torsional deformation mode, as an example of the natural mode of pressing tool deformation.
Figure 4J:
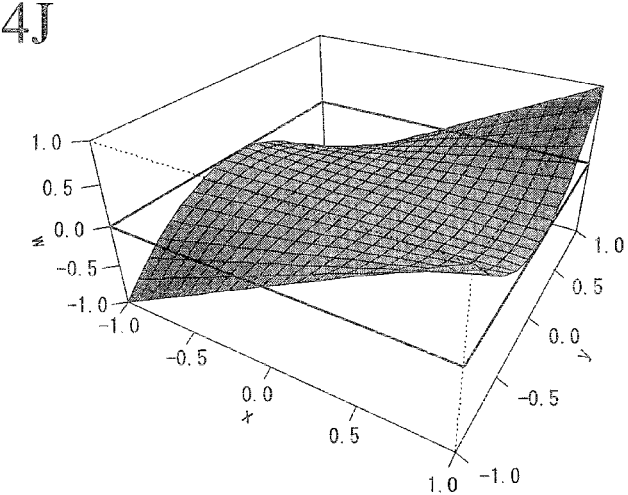
FIG. 4J is a schematic perspective view showing a second order torsional deformation mode, as an example of the natural mode of pressing tool deformation.

(Fifth Order) The first order torsional deformation mode shown in FIG. 4F can be expressed as the following equation (Formula 7).

$$w_5=\zeta\eta \quad \text{(Formula 7)}$$

Further, the first order bending deformation mode and the first order torsional deformation mode may be expressed by a trigonometric function, such as the following equations (Formula 8 to Formula 10).

$$w_3=1-\cos(\pi\zeta/2) \quad \text{(Formula 8)}$$

$$w_4=1-\cos(\pi\eta/2) \quad \text{(Formula 9)}$$

$$w_5=\sin\zeta \sin\eta \quad \text{(Formula 10)}$$

Further, the first order bending deformation mode and the first order torsional deformation mode may be expressed by a hyperbolic function, such as the following equations (Formula 11 to Formula 13).

$$w_3=\cos h(\pi\zeta/\cos h(\pi) \quad \text{(Formula 11)}$$

$$w_4=\cos h(\pi\eta)/\cos h(\pi) \quad \text{(Formula 12)}$$

$$w_5=\sin h\,\zeta \sin h\,\eta/(\sin h1)^2 \quad \text{(Formula 13)}$$

As described above, the natural modes can use a certain continuous function type under the condition of $-1 \leq \zeta, \eta \leq 1$, but particularly, when Formula 2 to Formula 7 are used, the rigid body displacement and elastic deformation of the pressing tool may be approximated with high accuracy, with a small amount of calculation. Further, in order to further improve the accuracy, the second order deformation mode shown in FIGS. 4G to 4J may be considered.

In the forming simulation according to the embodiment, the weight coefficient $a_i$ for the natural modes may be determined by measuring in advance the rigidity of the press or the pressing tool.

For example, the weight coefficient $a_i$ of the natural modes is given as the following equation, with a compliance integer $c_i$ for the i-th order natural mode, by actually measuring deformation of the pressing tool in respect to a predetermined forming load $P_{max}$. The compliance integer $c_i$ may be a constant for the forming process.

$$a_i(P) = c_i \cdot P_{max} \quad \text{(Formula 14)}$$

Further, the weight coefficient $a_i$ may be given as a function of the forming load P for the natural modes. In this case, the accuracy can be further increased. For example, when the deformation amount of the pressing tool and the forming load are in a substantially proportionate relationship, the compliance integer $c_i$ for the i-order natural mode is given as the following equation.

$$a_i(P) = c_i \cdot P \quad \text{(Formula 15)}$$

The compliance integer $c_i$ may be determined by measuring the deformation amount of the pressing tool with a strain gauge or a clearance gauge while changing the pressing load with a predetermined press. That is, when the modes are considered up to the fifth order natural mode, the number of unknown weight coefficients is six and, theoretically, they can be acquired by measuring the deformation amount at least six positions on the pressing tool surface. Further, a weight coefficient with the minimum error can be determined by increasing the number of measured positions.

Figure 5:
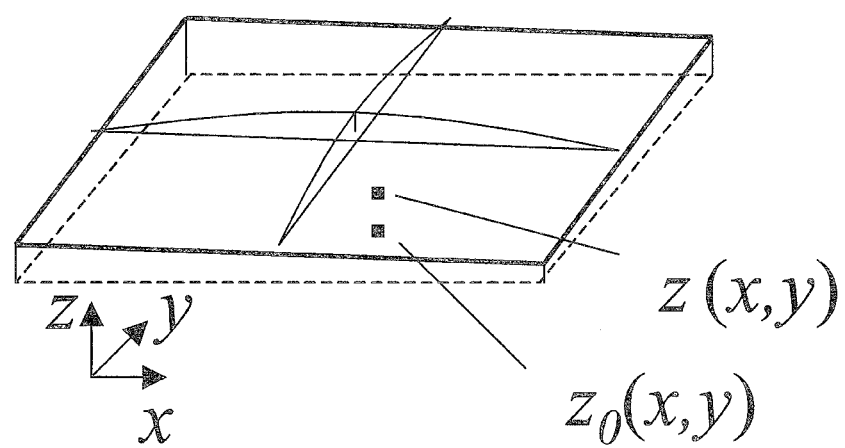
FIG. 5 is a schematic perspective view showing an example of a pressing tool deformation mode.

An example of the deformation mode of the pressing tool acquired from Formula 1 is shown in FIG. 5. FIG. 5 shows a combined deformation in which the rigid body displacement mode, the first order bending deformation mode, and the first order torsional deformation mode are combined, which corresponds to the second item at the right side of Formula 1.

Next, in the blank deformation amount calculation step, the contact state between the shape of the pressing tool which has been updated by the Formula 1 and the blank that is a deformed body is determined. Then, with respect to the region of the deformed body which is determined as being in contact with the pressing tool, the same speed in the normal direction of the contact surface as that of the pressing tool, and the friction force in the tangential direction of the contact surface are given so that the deformation amount of the blank is updated in a stress analysis method based on a common finite element method. For example, the stress analysis method using finite elements is disclosed in Non-patent Document 2.

The steps from the tool travel distance/deformation amount calculation step to the blank deformation amount calculation step are repeated until the time step becomes a predetermined time $t_{max}$.

It is possible to efficiently perform coupled analysis by using the calculation method, in consideration of elastic deformation of the pressing tool or the press.

Figure 10:
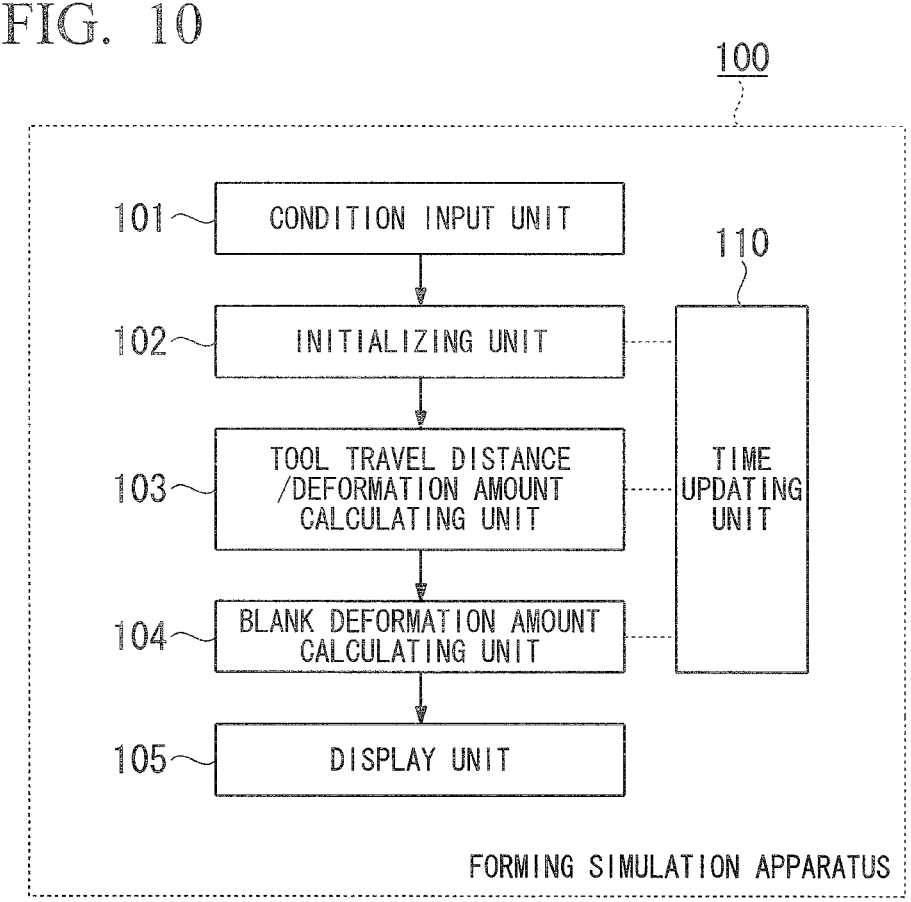
FIG. 10 is a block diagram showing a schematic configuration of a forming simulation apparatus.

Next, a forming simulation apparatus 100 according to an embodiment of the present invention is described with reference to FIG. 10. FIG. 10 is a block diagram showing a schematic configuration of a forming simulation apparatus 100.

The forming simulation apparatus 100 includes a condition input unit 101, an initializing unit 102, a tool travel distance/deformation amount calculating unit 103, a blank deformation amount calculating unit 104, a display 105, and a time updating unit 110. The condition input unit 101, initializing unit 102, tool travel distance/deformation amount calculating unit 103, blank deformation amount calculating unit 104, display 105, and time updating unit 110 are implemented as the functions of a CPU (Central Processing Unit) of a computer, for example.

In the condition input unit 101, analysis condition data, such as tool shape data, blank shape data, mechanical property data of a blank material, a pressing condition data, and time increment are input.

In the initializing unit 102, the setting of initial position and displacement of the pressing tool; displacement, stress, and strain of the blank; and time (t) are initialized (0 clear).

In the tool travel distance/deformation amount calculating unit 103, the coordinates on the pressing tool surface after deformation are updated by adding the deformation amount resulting from blank hold pressure onto the coordinates of the pressing tool surface calculated on the basis of the pressing tool travel speed given as a function of time or a forming stroke.

In the blank deformation amount calculating unit 104, the contact state between the shape of the pressing tool which has been updated and the blank that is a deformed body is determined. Then, with respect to the region of the deformed body which is determined as being in contact with the pressing tool, the same speed in the normal direction of the contact surface as that of the pressing tool, and the friction force in the tangential direction of the contact surface are given so that the deformation amount of the blank is updated in a stress analysis method based on a common finite element method.

Further, the functions of the tool travel distance/deformation amount calculating unit and the blank deformation amount calculating unit are repeated on the basis of the time updating unit 110 until a predetermined time $t_{max}$ passes after the initializing. The display 105 displays the pressing tool shape by superimposing the natural modes.

Further, the functions of the components of the forming simulation apparatus according to the embodiment may be implemented by executing programs saved in a Random Access Memory (RAM) or Read Only Memory (ROM) of a computer. Similarly, the steps of the forming simulation method may be implemented by executing programs saved in a RAM or a ROM of a computer. Those programs and a computer-readable recording medium where the programs are recorded are included in the present invention.

In detail, the programs are provided to the computer by being recorded on a recording medium, such as a CD-ROM, or through various transmitting media. Other than the CD-ROM, a flexible disk, a hard disk, a magnetic tape, an optical magnetic disc, and a nonvolatile memory card may be used as the recording medium where the programs are recorded. Meanwhile, a communication medium in a computer network system for propagating and supplying program information as carrier wave may be used as the transmitting medium for the programs. The computer network is a LAN, a WAN Local Area Network (LAN), a Wide Area Network (WAN) such as the internet, and a radio communication network, and the communication medium is a wire channel, such as an optical fiber, or a wireless channel.

Further, the programs included in the present invention are not limited to when the functions of the embodiment are implemented by executing supplied programs with a computer. For example, the programs are included in the present invention, even if the functions of the embodiment are implemented with an OS (Operation System) that executes the programs in the computer or other application software. Further, the programs are included in the present invention, even if all or some of the processes of the supplied programs are performed by a function extension board or a function extension unit of the computer and the functions of the embodiment are implemented.

EXAMPLES

The present invention is described in detail based on the Examples with reference to the drawings.

Forming simulation and a test result for comparative examination of an angular vessel are shown in FIGS. 1 and 2. Further, the material and the pressing conditions used in the examination are shown in Table 1.

TABLE 1

| Item | Specifications |
|---|---|
| Blank material | Soft steel (JSC 270D), 1.2 mm thickness × 250 mm × 250 mm (Yield strength = 171 MPa, Tensile strength = 313 MPa, Elongation = 48%) |
| Dimensions of pressing tool | Inner diameter of die = 100 mm × 100 mm, Shoulder R = 5 mm<br>Outer diameter of punch = 97.5 mm × 97.5 mm, Shoulder R = 5 mm<br>Outer diameter of blank holder = 300 mm × 300 mm |
| Forming conditions | Drawing (Blank hold pressure 20 ton (constant), Formed height 50 mm) |
| Press | Hydraulic servo-press, Forming load = maximum 200 ton |

The deformation amount of a pressing tool was measured in advance while variously changing the blank hold load. In the Examples, the deformation state of the pressing tool in press hold-pressing was estimated from the thickness of a crushed solder after holding and drawing the soft solder several times, instead of a blank, between the die and the blank holder. As a result, it was found that in the actual pressing tool, a clearance is generated between the die and the blank holder in the blank hold-pressing by deformation of the pressing tool/press and the size can be approximated by combining the rigid body rotation mode (first order and second order basic mode) expressed by Formulae 3 and 4, the first order bending deformation mode (third order and fourth order basic mode) expressed by Formulae 5 and 6, and the first order torsional deformation mode (fifth order basic mode) expressed by Formula 7. Further, the weight coefficients $a_0$ to $a_5$ for the natural modes were acquired by numerical calculation such that the difference between the measured value of the solder thickness and the estimated value of the displacement amount of the pressing tool acquired from Formula 1 became the minimum, when a blank hold load P of 20 tons was applied.

$$a_0 = 0.1 \text{ (mm)} \quad \text{(Formula 16)}$$

$$a_1 = a_2 = 0.02 \text{ (mm)} \quad \text{(Formula 17)}$$

$$a_3 = a_4 = 0.2 \text{ (mm)} \quad \text{(Formula 18)}$$

$$a_5 = 0.02 \text{ (mm)} \quad \text{(Formula 19)}$$

However, in Formulae 3 to 7, $$\zeta = x/150, \eta = y/150 \quad \text{(Formula 20)}$$

That is, as shown in FIG. 5, the surface inclines in the X-axial direction and the Y-axial direction, and the center portion bends in the Z-axial direction so as to generate a torsional deformation.

Next, forming simulation was performed, using a forming simulation program (PAM-STAMP, product name, by ESI Co., Ltd.), which is on the market, on the basis of the deformation amount of the pressing tool.

The principal analysis conditions of the forming simulation according to the Examples are shown in the following Table 2.

TABLE 2

| Item | Analysis conditions |
|---|---|
| Material | Soft steel (JSC 270D) (Yield strength = 171 MPa, Tensile strength = 313 MPa, Elongation = 48%) |
| Dimensions of blank | 1.2 mm plate thickness × 250 mm × 250 mm |
| Forming method | Drawing (Blank hold pressure 20 ton (constant), Formed height 50 mm) |
| Number of elements | 125 × 125 = 15625 elements (Minimum mesh dimension) |
| Number of nodes | 15876 nodes |
| Used elements | 4 nodal shell elements (order reduction integration element: 1 integration point in plane × 5 integration points in plate thickness direction) |

Figure 6:
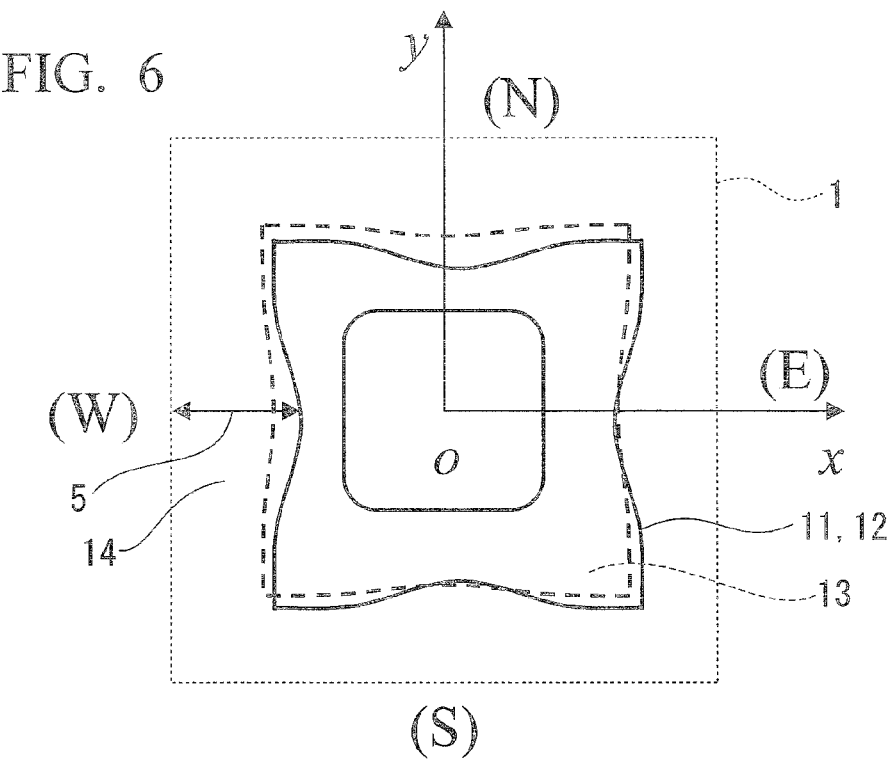
FIG. 6 is an elevation view showing a calculation result of the configuration of a flange shape of a formed product.

As an example of a calculation result, the flange shape of the formed product is shown with the calculation result that does not consider deformation of the pressing tool as the test result and the comparative example of FIG. 6. Further, in Embodiment 1 of FIG. 7, the flange inflow amount of the center of the N, E, S, and W sides of FIG. 6 is shown with the actual measurement result. It was found that the inflow of the straight sides is around the same in the comparative example without considering the deformation of the pressing tool, while in the embodiment considering the deformation of the pressing tool, the inflow amount is smaller at the E and S sides, where the restraint of the blank holder is stronger than at the N and W sides and approximately corresponds to the actual measurement value.

Figure 7:
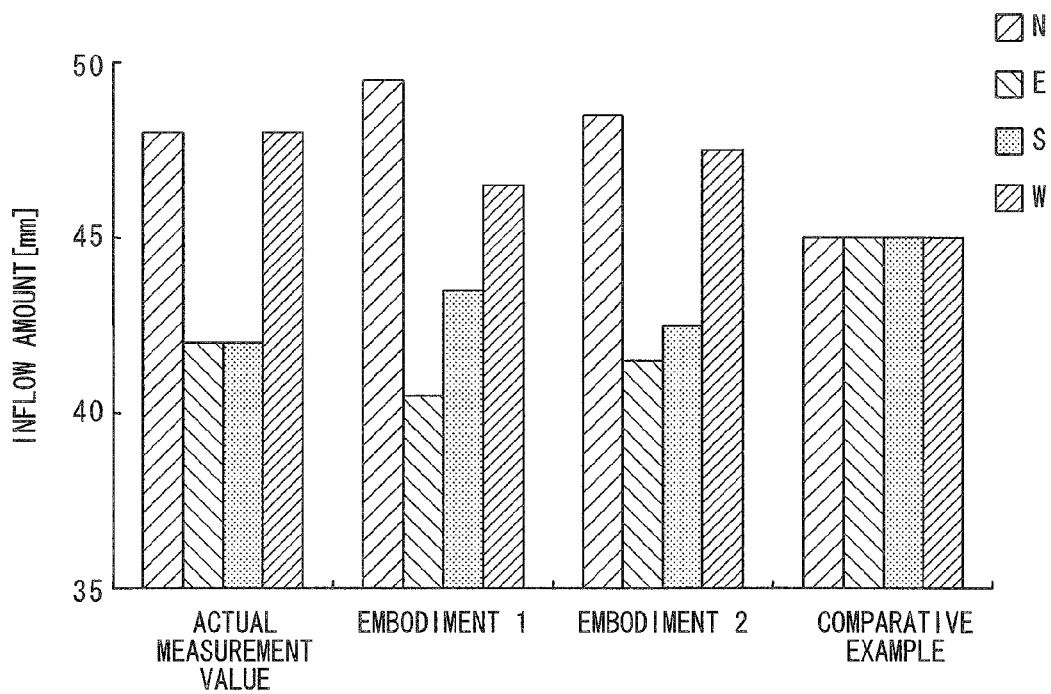
FIG. 7 is a graph showing the flange inflow amount.

As another Example, it is assumed that the weight coefficients for the deformation modes are proportionate to the blank hold load P from the results of variously changing the blank hold load P, and a calculation result under this setting is shown in Example 2 of FIG. 7.

$$a_0 = -0.05 \text{ (mm/ton)} \times P \text{ (ton)} \quad \text{(Formula 21)}$$

$$a_1 = a_2 = 0.001 \text{ (min/ton)} \times P \text{ (ton)} \quad \text{(Formula 22)}$$

$$a_3 = a_4 = -0.010 \text{ (min/ton)} \times P \text{ (ton)} \quad \text{(Formula 23)}$$

$$a_5 = 0.001 \text{ (mm/ton)} \times P \text{ (ton)} \quad \text{(Formula 24)}$$

It is found that the weight coefficient a can be brought closer to the actual measurement value by giving the weight coefficient as a function of the blank hold load P.

Figure 8:
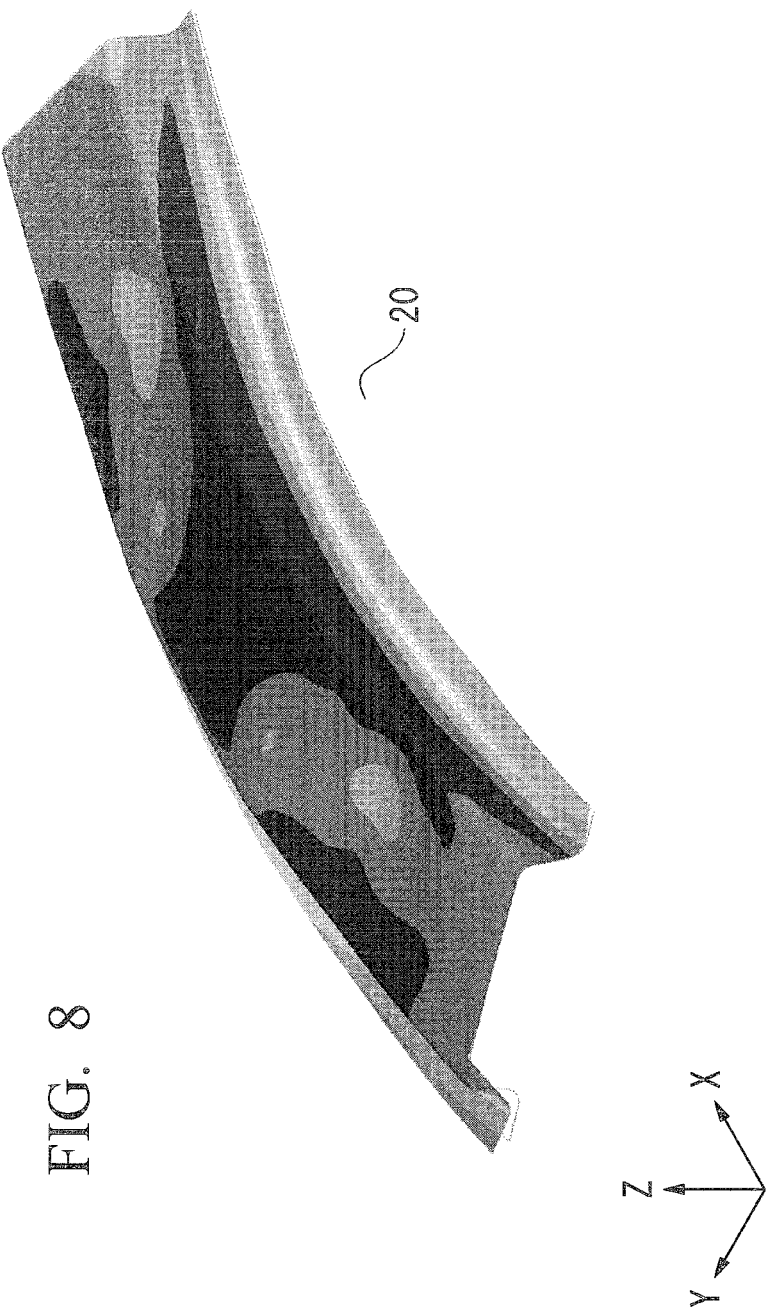
FIG. 8 is a perspective view showing a pressed product that is used as an object of expected springback.

Further, as another Example, an estimation result of springback in a round product 20 is shown in FIG. 8. Further, a corresponding test for comparative examination was performed.

The used material and pressing conditions are shown in Table 3 and the calculation conditions are shown in Table 4.

TABLE 3

| Item | Specifications |
|---|---|
| Material/dimensions of pressed product | High-tensile sheet metal (JAC 980Y), Thickness 1.2 mm (Yield strength = 671 MPa, Tensile strength = 1055 MPa, Elongation = 15%) (Hat-shaped cross-section) 100 mm × 30 mm × (length) 500 mm (Rounded inside R) = 500 mm |

TABLE 3-continued

| Item | Specifications |
|---|---|
| Dimensions of pressing tool (SKD11) | Die/punch outer dimension = 800 mm × 600 mm |
| Forming conditions | Drawing (Blank hold pressure 50 ton, Formed height 30 mm) |
| Press | Hydraulic servo-press, Forming load = maximum 200 ton |

TABLE 4

| Item | Analysis conditions |
|---|---|
| Material | High-tensile sheet metal (JAC 980Y) (Yield strength = 671 MPa, Tensile strength = 1055 MPa, Elongation = 15%) |
| Thickness | 1.2 mm |
| Forming method | Drawing (Blank hold pressure 50 ton, Formed height 30 mm)→Springback |
| Number of elements | 31712 elements |
| Number of nodes | 31997 nodes |
| Useds element | 4 nodal shell elements (order reduction integration element: 1 integration point in plane × 5 integration points in plate thickness direction) |

The deformation amount of the pressing tool was measured with respect to the maximum value of the blank hold load. In the embodiment, the weight coefficients $a_i$ for the natural modes expressed by Formula 2 to Formula 7 were acquired as follows by estimating the deformation state of the pressing tool in blank hold-pressing, from the thickness of the pressed solder after holding and drawing the soft solder several times, instead of a blank, between the die and the blank holder. It was assumed that the weight coefficients $a_i$ were proportionate to the blank hold load P.

$$a_0 = -0.05 \text{ (mm/ton)} \times P \text{ (ton)} \qquad \text{(Formula 25)}$$

$$a_1 = a_2 = 0.002 \text{ (mm/ton)} \times P \text{ (ton)} \qquad \text{(Formula 26)}$$

$$a_3 = a_4 = 0.005 \text{ (mm/ton)} \times P \text{ (ton)} \qquad \text{(Formula 27)}$$

$$a_5 = 0.001 \text{ (mm/ton)} \times P \text{ (ton)} \qquad \text{(Formula 28)}$$

However, in Formulae 3 to 7, $$\zeta = x/400, \eta = y/300 \qquad \text{(Formula 29)}$$

In the product, the flange end warped, as shown in FIG. 8, due to the springback generated in the longitudinal direction of the member, when a high-strength material was used. Distortion was increased when the material was asymmetric to the pressing tool due to the deformation of the pressing tool, even if the shape of the product was symmetric (in the X-axial direction).

Figure 9:
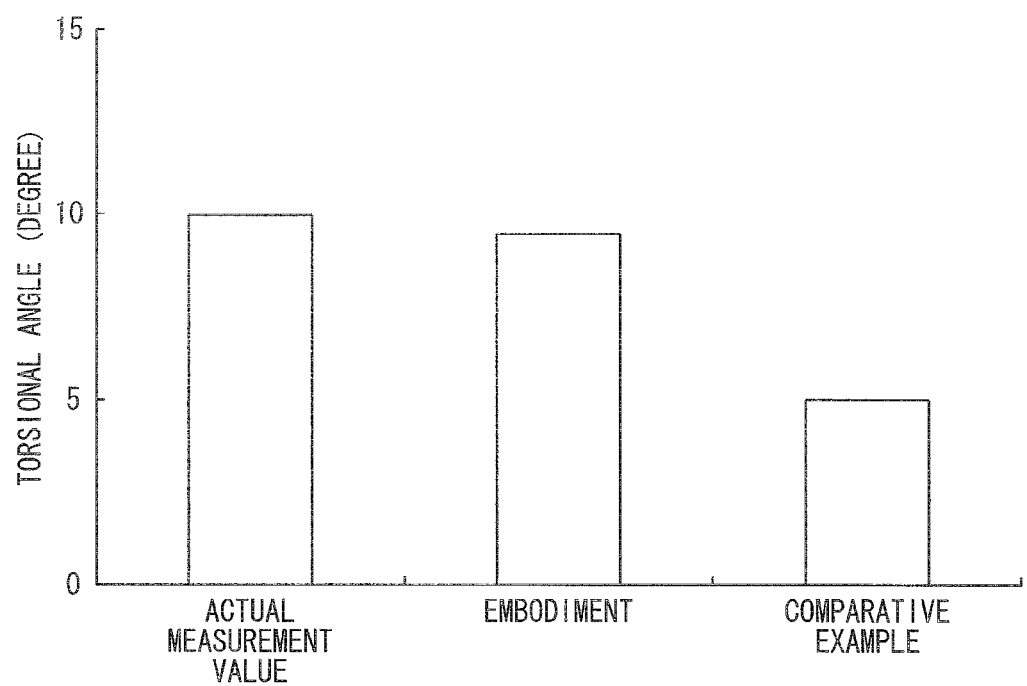
FIG. 9 is a graph showing a torsional angle that is actually measured and torsional angles of an example and a comparative example.

FIG. 9 shows a calculation result of the torsional angle, considering the deformation of the pressing tool, (the embodiment), and a comparative example of a shape without deformation of the pressing tool, that is, which is symmetric in the X-axial direction, together with the actual measurement result. The torsional angle is a relative torsional angle of both ends (hat shape) of the member, from the horizontal surface of the member. The magnitude of the torsion was smaller than the actual measurement value in the comparative example without considering the deformation of the pressing tool, whereas it was almost the same as the actual measurement value in the embodiment.

INDUSTRIAL APPLICABILITY

According to the present invention, it is possible to efficiently perform forming simulation considering deformation of the pressing tool or the press in pressing, by modeling deformation of the pressing tool that comes in contact with a workpiece, using a low-order natural mode. Therefore, the industrial applicability is high.

REFERENCE SIGNS LIST

1: BLANK
2: PUNCH
3: DIE
4: BLANK HOLDER
5: FLANGE INFLOW AMOUNT
11: CALCULATION RESULT
12: ACTUAL MEASUREMENT RESULT OF PRESSED PRODUCT
13: CALCULATION RESULT OF PRESSED PRODUCT BY COMPARATIVE EXAMPLE
14: FLANGE OF PRESSED PRODUCT
20: ROUND PRODUCT
100: FORMING SIMULATION APPARATUS
101: CONDITION INPUT UNIT
102: INITIALIZING UNIT
103: TOOL TRAVEL DISTANCE/DEFORMATION AMOUNT CALCULATING UNIT
104: BLANK DEFORMATION AMOUNT CALCULATING UNIT
105: DISPLAY
110: TIME UPDATING UNIT

The invention claimed is:

1. A press forming simulation method using a finite element method for a sheet metal, the method comprising:
   calculating a deformation state of a surface shape of a pressing tool with a computer by superimposing at least one natural mode on the surface shape, in a no-load state, using a formula:

$$z(x, y) = z_0(x, y) + \sum_{i=0}^{n} a_i w_i(\xi, \eta)$$

where x, y, and z are coordinates in a Cartesian coordinate system, $z_0$ is a coordinate of the surface shape before deformation, $w_i$ is an i-th order natural mode, $a_i$ is a weight coefficient for the i-th order natural mode, and n is the maximum order of the i-th order natural mode and the i-th order natural mode is shown by non-dimensional coordinates $(\xi, \eta)$; and
   visually displaying the surface shape of the pressing tool based on the results of the calculation on a display.

2. The press forming simulation method according to claim 1,
   wherein the at least one natural mode is selected from the group consisting of a rigid body displacement mode, a rigid body rotation mode, a first order bending deformation mode, and a first order torsional deformation mode.

3. The press forming simulation method according to claim 1,
   wherein a weight coefficient of the at least one natural mode is sequentially changed in accordance with a forming load.

4. The press forming simulation method according to claim 1,
wherein a weight coefficient of the at least one natural mode is determined in advance from a deformation amount in a pressing test that applies a predetermined forming load.

5. A press forming method based on the press forming simulation methods of any one of claims 1 to 4.

6. A formed product that is pressed on the basis of the press forming simulation methods of any one of claims 1 to 4.

7. A press forming simulation apparatus using a finite element method for a sheet metal, the apparatus comprising:
a computer processor configured to calculate a deformation state of a surface shape of a pressing tool by superimposing at least one natural mode on the surface shape, in a no-load state, using a formula:

$$z(x, y) = z_0(x, y) + \sum_{i=0}^{n} a_i w_i(\xi, \eta)$$

where x, y, and z are coordinates in a Cartesian coordinate system, $z_0$ is a coordinate of the surface shape before deformation, $w_i$ is an i-th order natural mode, $a_i$ is a weight coefficient for the i-th order natural mode, and n is the maximum order of the i-th order natural mode and the i-th order natural mode is shown by non-dimensional coordinates $(\xi, \eta)$; and
a display unit which displays the surface shape of the pressing tool based on the results of the calculation.

8. The press forming simulation apparatus according to claim 7, wherein the at least one natural mode is selected from the group consisting of a rigid body displacement mode, a rigid body rotation mode, a first order bending deformation mode, and a first order torsional deformation mode.

9. The press forming simulation apparatus according to claim 7 or 8, wherein a weight coefficient of the at least one natural mode is sequentially changed in accordance with a forming load.

10. The press forming simulation apparatus according to claim 7 or 8, wherein a weight coefficient of the at least one natural mode is determined in advance from a deformation amount in a pressing test that applies a predetermined forming load.

11. A press forming simulation computer program product embodied on a non-transitory computer readable media using a finite element method for a sheet metal, the computer program product comprising:
first computer-readable program code to calculate a deformation state of a surface shape of a pressing tool by superimposing at least one natural mode on the surface shape, in a no-load state using a formula:

$$z(x, y) = z_0(x, y) + \sum_{i=0}^{n} a_i w_i(\xi, \eta)$$

where x, y, and z are coordinates in a Cartesian coordinate system, $z_0$ is a coordinate of the surface shape before deformation, $w_i$ is an i-th order natural mode, $a_i$ is a weight coefficient for the i-th order natural mode, and n is the maximum order of the i-th order natural mode and the i-th order natural mode is shown by non-dimensional coordinates $(\xi, \eta)$; and
to visually display the surface shape of the pressing tool based on the results of the calculation on a display.

12. The press forming simulation computer program product according to claim 11,
wherein the at least one natural mode is selected from the group consisting of a rigid body displacement mode, a rigid body rotation mode, a first order bending deformation mode, and a first order torsional deformation mode.

13. The press forming simulation computer program product according to claim 11,
wherein a weight coefficient of the at least one natural mode is sequentially changed in accordance with a forming load.

14. The press forming simulation computer program product according to claim 11,
wherein a weight coefficient of the at least one natural mode is determined in advance from the deformation amount in a pressing test that applies a predetermined forming load.

* * * * *